United States Patent [19]
Nelson

[11] Patent Number: 6,088,183
[45] Date of Patent: Jul. 11, 2000

[54] ARCUATE SCAN READ/WRITE ASSEMBLY

[75] Inventor: Gary T. Nelson, Carlsbad, Calif.

[73] Assignee: Seagate Peripherals, Inc., Scotts Valley, Calif.

[21] Appl. No.: 08/337,255

[22] Filed: Nov. 10, 1994

[51] Int. Cl.[7] .......................... G11B 21/02; G11B 15/12
[52] U.S. Cl. ............................... 360/75; 360/46; 360/55; 360/61; 360/62
[58] Field of Search ...................... 360/113, 108, 360/46, 53, 48, 63, 64, 70, 72.2, 75, 77.01, 77.02, 61

[56] References Cited

U.S. PATENT DOCUMENTS

| | | | |
|---|---|---|---|
| 3,987,490 | 10/1976 | Highnote et al. | 360/108 |
| 4,926,273 | 5/1990 | Tabuchi et al. | 360/64 |
| 5,191,489 | 3/1993 | Isozaki . | |
| 5,257,272 | 10/1993 | Fredrickson | 360/40 X |
| 5,260,703 | 11/1993 | Nguyen et al. | 360/46 X |
| 5,293,277 | 3/1994 | Shimazaki et al. | 360/64 |
| 5,369,534 | 11/1994 | Han | 360/64 |
| 5,455,729 | 10/1995 | Nelson et al. | 360/5 |
| 5,488,518 | 1/1996 | Shier | 360/67 |
| 5,563,746 | 10/1996 | Bliss | 360/53 |
| 5,619,539 | 4/1997 | Coker et al. | 360/46 |
| 5,657,013 | 8/1997 | Tajima | 360/46 X |
| 5,737,141 | 4/1998 | Hardwick et al. | 360/61 X |

FOREIGN PATENT DOCUMENTS

| | | |
|---|---|---|
| 0458510 A2 | 5/1991 | European Pat. Off. . |
| 6089401 | of 0000 | Japan . |
| 57-098020 | 12/1980 | Japan . |
| 59-123333 | 12/1982 | Japan . |
| 59-146407 | 2/1983 | Japan . |
| 62-001102 | 6/1985 | Japan . |
| 3235202 | 2/1990 | Japan . |
| 03276401 | 12/1991 | Japan . |
| WO 93/26005 | 12/1993 | WIPO .......................... G11B 15/467 |

OTHER PUBLICATIONS

Negahban, et al.: "A Two–Chip CMOS Read Channel For Hard–Disk Drives," 1993 IEEE International Solid–State Circuits Conference ISSCC '93, San Francisco, CA, Feb. 24–26, 1993.

Primary Examiner—Glenton B. Burgess
Assistant Examiner—K. Wong
Attorney, Agent, or Firm—Fliesler, Dubb, Meyer & Lovejoy LLP

[57] ABSTRACT

A circuit having a stationary portion and a rotating portion suitable for an arcuate scan assembly in a storage device is disclosed. The circuit includes a stationary encoder outputting an encoded write signal; a power supply; and a rotary transformer comprising a stator and a rotor. The stator has at least one stator winding and the rotor has at least one rotor winding, with the stationary encoder coupled to the stator winding. A decoder is provided and includes an input coupled to said at least one rotor winding and rotating with the rotor. The input receives an encoded write signal, and the decoder further has an output. Also provided is an amplifier coupled to receive the decoder output, and further being coupled to the power supply via the rotating transformer. The amplifier rotates with the decoder and the rotor. Also, at least one read/write head is included and is coupled to receive an amplifier output from the amplifier and return a read data signal to the amplifier. Also disclosed is a method for reading and writing data to a tape storage medium. The method may include the steps of: providing a rotating head drum adjacent to the tape, the head drum including at least one read/write head and an amplifier coupled to the head; encoding preamplifier control signals and the data in a synchronous signal; transmitting the synchronous signal through a rotating transformer to the head drum; transmitting a clock signal through the rotating transformer; transmitting a power to the preamplifier; and decoding the synchronous signal so that the preamplifier is directed to write the data to the tape.

48 Claims, 13 Drawing Sheets

| BIT 15 | BIT 14 | BIT 13 | BIT 12 | BIT 11 | BIT 10 | BIT 9 | BIT 8 |
|---|---|---|---|---|---|---|---|
| Chip Select | Write Enable | Reserved (Set to 0) | Reserved (Set to 0) | Set to 1 | Head Select 2 | Head Select 1 | Head Select 0 |

| BIT 7 | BIT 6 | BIT 5 | BIT 4 | BIT 3 | BIT 2 | BIT 1 | BIT 0 |
|---|---|---|---|---|---|---|---|
| Positive Azimuth Current 3 | Positive Azimuth Current 2 | Positive Azimuth Current 1 | Positive Azimuth Current 0 | Negative Azimuth Current 3 | Negative Azimuth Current 2 | Negative Azimuth Current 1 | Negative Azimuth Current 0 |

FIG. 7

ARCUATE SCAN READ/WRITE ASSEMBLY

CROSS-REFERENCE TO RELATED APPLICATIONS

ARCUATE SCAN HEAD ASSEMBLY UTILIZING AFT TILT POSITIONER, U.S. patent application Ser. No. 08/113,996 now U.S. Pat. No. 5,585,978, inventors John M. Rottenburg, et al.

PROCESS FOR MANUFACTURING RECORDING HEADS FOR MAGNETIC STORAGE DEVICES, U.S. patent application Ser. No. 08/151,068 now U.S. Pat. No. 5,523,539, inventors John Hoogerwerf, Robert Heinze, and John M. Rottenburg.

MULTICHANNEL ROTATING TRANSFORMER, U.S. patent application Ser. No. 08/114,492 now U.S. Pat. No. 5,455,729, inventors Gary T. Nelson and Robert R. Heinze.

These applications are assigned to the assignee of the present invention and are hereby specifically incorporated by reference.

FIELD OF THE INVENTION

The invention relates to data storage on magnetic media, specifically data storage magnetic tape using a rotating head drum, and to improving the performance of such storage devices by improving the manner in which information is stored on the tape.

BACKGROUND OF THE INVENTION

Data storage tape drives are widely used in data processing systems as either the primary data storage device or, more often, as a back-up data storage device to the system's hard disk drive. Conventional tape drives are designed to transfer data to and from a length of magnetically encoded tape, typically one-quarter inch in width, which is transferred between a supply reel and a take-up reel. While several tape drive designs exist for recording and playing back a data tape, the two most widely used drive technologies up to now have been stationary head tape drives for longitudinal recording and rotary head tape drives for transverse linear or "helical" recording.

In longitudinal recording, a tape drive includes a plurality of adjacent stationary heads which lie across the width of a data tape. In helical recording, one or more heads are provided around the circumferential surface of a rotating cylindrical drum. An advancing data tape encounters the rotating drum such that the longitudinal direction of the tape is angled with respect to the plane in which a recording head on the drum rotates. As such, rotary head helical recording provides a relatively large areal density.

Presently in the tape drive industry, as in other data storage technology areas, there is a movement toward decreasing drive dimensions while at the same time increasing data storage capacity. Existing longitudinal and helical recording technologies have proven inadequate in meeting these demands.

An alternative to the longitudinal and helical recording scheme is a recording scheme which incorporates an "arcuate scan" of the tape. In arcuate scan drives, a rotating drum having a plurality of heads mounted thereon is positioned perpendicular to the tape and rotated such that each head makes an arcuate path over the tape as the tape passes around the head drum. Arcuate scan recording has been known for some time, but has been disfavored due to the lack of effective servoing schemes for accurately maintaining alignment of the heads with the arcuate data tracks.

U.S. patent application Ser. No. 07/898,926, filed Jun. 12, 1992, by J. Lemke (hereafter "the Lemke application"), discloses a relatively compact arcuate scan tape drive for recording and playing back up to approximately 10 gigabits on a conventional mini-cassette tape, a storage capacity which is higher than that previously obtained with either longitudinal or helical recording. FIGS. 1–2 of the present application are reproductions of FIGS. 1–2 of the Lemke application and constitute a perspective view of the arcuate scan drive, and a top view of the head drum/tape interface. The Lemke application discloses a tape drive including a plurality of heads placed on the front circular face of a rotating drum, with the axis of rotation of the rotating drum being perpendicular to and intersecting with the longitudinal axis of the advancing tape. Head drum 30 rotates about axis 38 to pass heads 35 in arcuate paths, shown in FIG. 3, along tape 21 as tape 21 passes head drum 30. As the tape advances from the right to the left and the drum rotates in a counter-clockwise direction, the heads trace arcuately-shaped data tracks 40, substantially transverse to the longitudinal axis of tape 21. As also shown in FIG. 3, arcuate tracks 40 are not entirely semicircular, as the motion of the tape causes a pitch change in the arcuate path as the head transverses the tape from bottom to top as shown in FIG. 3.

The Lemke application discusses a drum having a plurality of heads which utilizes a sequential, three head data transfer and positioning scheme. In the Lemke arrangement, the heads are arranged in triads where the first head is a read head, the second a write head and the third a servo head, each passing over a given track in succession. It should be readily understood that numerous head schemes are suitable for use with arcuate scan disk drives.

A significant concern in an arcuate scan drive, and indeed any information recording system wherein a rotating head drum section must electrically communicate with a stationary data channel and controller, is the commutation of the data signals from the stationary section to the rotating section. Generally, this involves use of a rotary transformer or a slip ring. In either alternative, there are limitations in the amount of signal which is successfully commutated from the stationary section to the rotating section. In the Lemke application, the rotating section is essentially passive, meaning that the data transmitted from the stationary section of the recording arrangement must be of sufficient strength to be passed by the heads to the tape.

Data storage devices generally include encoding means to code the "raw" data signal prior to recording onto the magnetic storage medium. Generally, raw data signals are unsuitable for recording by the recording channel as there is no bound on the D.C. component in the data stream. In a rotating transformer, when such signals are transmitted across the transformer, over time, the transformer voltage will tend to equalize to the area of greatest voltage, either more positive or negative.

When transmitting encoded data across a rotating transformer and providing such signals directly to a recording head, the encoding scheme must ensure that the coded data is free of any DC component or is "DC-free code." When such DC-free codes are utilized to encode data which must pass from the primary to the secondary of a rotating transformer, the inefficiency inherent in such codes reduces the overall storage capacity of the device.

An alternative to commutatively coupling data signals across a rotary transformer to recording heads is shown in U.S. Pat. No. 5,191,489. As shown therein, data and control information is transmitted via a rotary transformer and "transmission system," respectively, to the pre-amplifier on the rotating side of a helical scan recording arrangement. The pre-amplifiers then drive the recording heads directly while both are rotating adjacent to the storage medium. The system disclosed shows data signals transmitted over a four channel rotary transformer; four separate sets of data are transmitted to four amplifiers driving four recording heads. A "transmission system", separate from the rotary transformer and described with respect to the prior art as a slip ring, transmits control signals to the four amplifiers located on the rotating portion of the system. An encoder on the stationary portion of the read/write assembly encodes gain control signal data, a clock signal, and a digital-to-analog enable signal into a single synchronous stream of control for transmission across the "transmission system." A decoder on the rotating section separates the control data and provides the decoded control information to a digital-to-analog converter which controls the pre-amplifiers.

While this scheme is advantageous in reducing the size of the "transmission system" needed to transmit the pre-amp control data, two separate elements—a transmission system and separate four-channel rotary transformer—are required to transmit the data signals to the rotating section for information recording onto the data storage medium.

An alternative configuration for controlling pre-amplifier circuitry on a rotating section of a recording apparatus is shown in U.S. Pat. No. 4,851,935, wherein video data signals are transmitted to a rotating head in a scheme utilizing three rotary transformers. One of the transformers carries the data to be recorded, another carries switching information, and the third carries power to a separate erase head utilized during the write mode only. Switching between the multiple heads disclosed therein in various embodiments is accomplished through a Hall effect element or magnetic spindle which generates an alternating signal to a phase inverter which switches the data to be recorded between the heads solely based on the rotational position of the rotating drum.

SUMMARY OF THE INVENTION

The invention comprises an apparatus and method for recording information to a storage medium in a data storage device having a stationary portion and a rotating head assembly. In one aspect, the invention comprises a circuit provided on the stationary portion and the rotating portion. The circuit comprises: a stationary encoder; a power supply; a rotary transformer comprising a stator and a rotor, the stationary encoder coupled to the stator; a decoder coupled to and rotating with the rotor; an amplifier coupled to the decoder, and coupled to the power supply via the rotating transformer, the amplifier rotating with the decoder and the rotor; and at least one read/write head, coupled to the amplifier. Generally, the rotary transformer further includes at least a first and second channels, each channel comprised of a rotor winding and a corresponding stator winding, and wherein the power supply and amplifier are coupled via the first channel, and the encoder and decoder are coupled via the second channel. The rotary transformer may further includes a third channel and the encoder provides a clock output signal to the decoder via the third channel, and may include a fourth channel coupled to the amplifier and the read/write head, the fourth channel having relative isolation from the first channel.

In a further unique aspect, a capacitor is provided and is coupled to the amplifier and the power supply, for storing charge when the power supply is active, and providing charge to the amplifier when the power supply is not active.

The method for reading and writing data to a tape storage medium, comprises the steps of: providing a rotating head drum adjacent to the tape, the head drum including at least one read/write head and an amplifier coupled to the head; encoding preamplifier control signals and the data in a synchronous signal; transmitting the synchronous signal through a rotating transformer to the head drum; transmitting a clock signal through the rotating transformer; transmitting a power to the preamplifier; and decoding the synchronous signal so that the preamplifier is directed to write the data to the tape.

The invention provides several advantages in improving the storage capacity of tape storage devices while decreasing the physical size of such devices.

The signal-to-noise ratio of recorded data on a tape storage medium in an arcuate scan disk drive is also improved.

The read/write heads in an arcuate scan tape drive are directly coupled to driving amplifiers so that data can be recorded onto the tape medium without the use of a DC free encoding scheme thereby increasing the density of tape drives.

The manufacturability of tape drives is improved by reducing the sensitivity of the manufacturing process to intolerances of mechanical components such as transformers and motors.

In addition the data rate of data from a host system to the storage medium is improved.

BRIEF DESCRIPTION OF THE DRAWINGS

The invention will be described with respect to the particular embodiments thereof. Other objects, features, and advantages of the invention will become apparent with reference to the specification and drawings in which:

FIG. 7 is a representation of the control word format used in conjunction with the write control circuitry of the present invention.

DETAILED DESCRIPTION OF THE INVENTION

The data storage system of the present invention will be described with reference to FIGS. 4–11.

Figure 1:
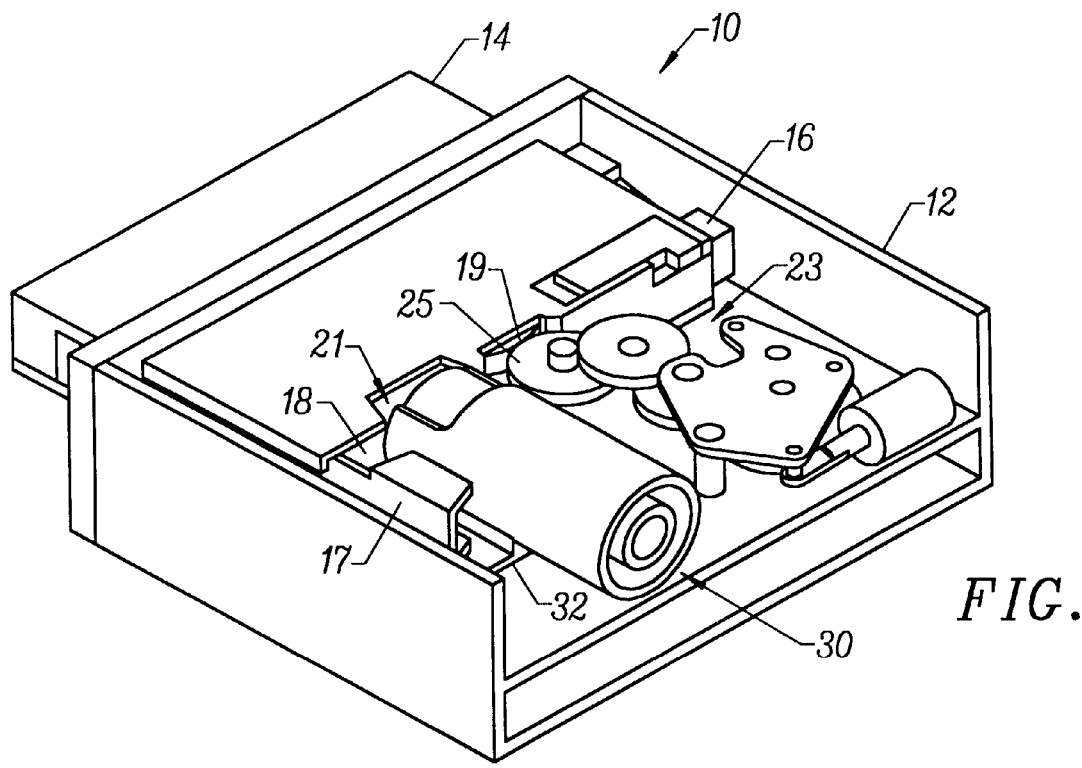
FIG. 1 is a perspective view of an arcuate scan tape assembly such as that disclosed in U.S. patent application Ser. No. 07/898,926, inventors Lemke, et al.
Figure 2:
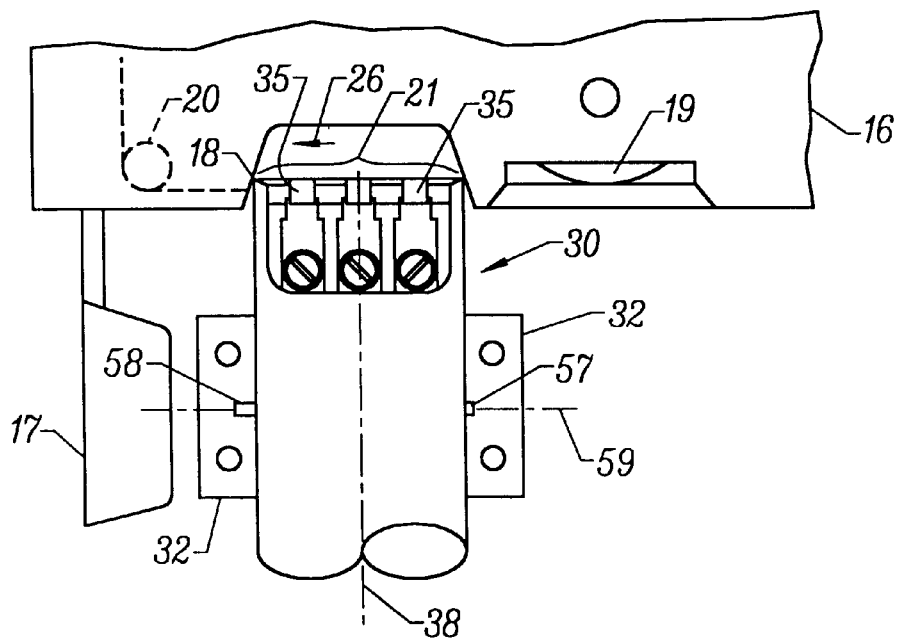
FIG. 2 is a top view of an arcuate scan head assembly interacting with a tape storage medium.
Figure 3:
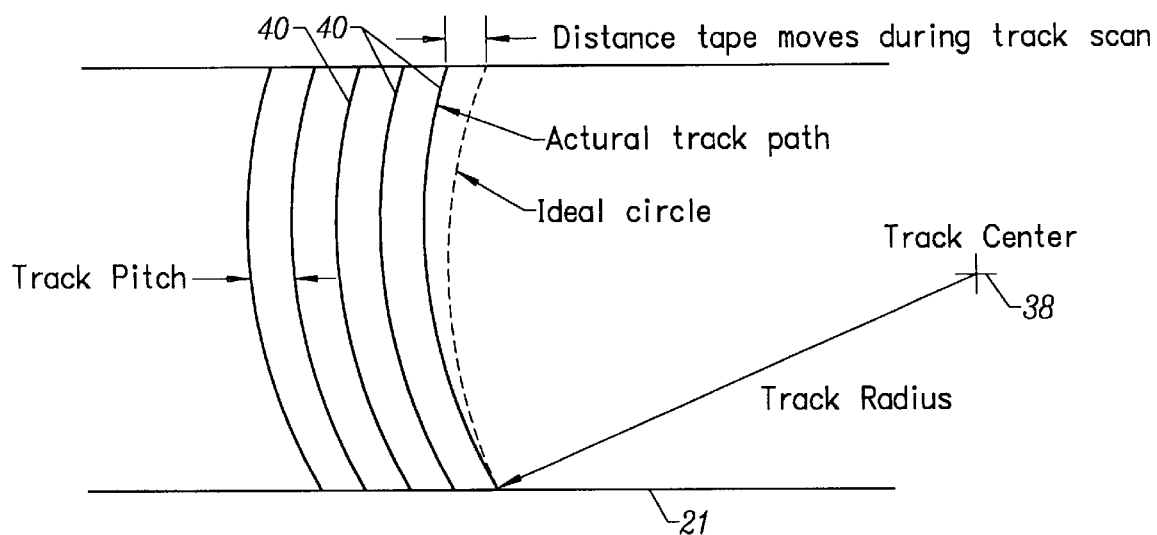
FIG. 3 is a plan view of the magnetic side of a tape showing the positioning of arcuate data tracks thereon.
Figure 4:
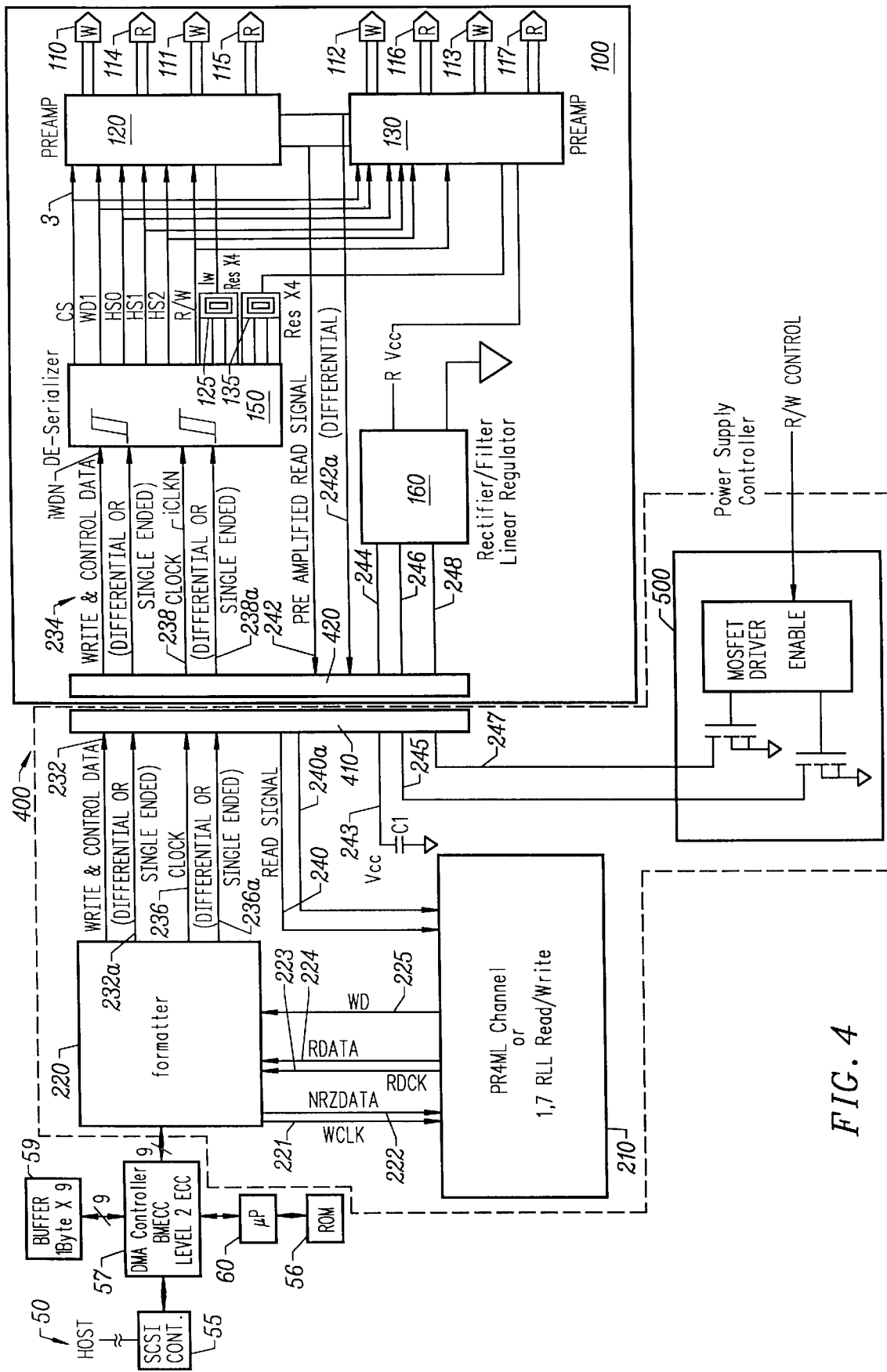
FIG. 4 is a block diagram of the data read and write circuitry in accordance with the present invention.

FIG. 4 is a block diagram of the data storage system as utilized to record and retrieve data in a storage device with a rotating head drum, such as an arcuate scan disk drive. The invention solves several problems attending the development of arcuate scan data storage devices, and allows substantial reductions in the physical space required by the mechanical components of an arcuate scan drive.

While the invention will be described with reference to an arcuate scan disk drive, the applicability of the invention is not limited to arcuate scan disk drives, but is useful in all systems wherein data is transmitted from a stationary section to a rotating recording section.

One aspect of the invention includes providing data to a number of read/write heads through a single rotating transformer between a rotating head assembly and the stationary electronics of the system with a minimum number of transformer channels (each channel being comprised of opposing primary and secondary windings on the transformer). A single channel is used to transmit write data and control signals, while separate channels carry data read back from the storage medium, power, and clock signals. The data and control signals are encoded in a synchronous communication stream for transmission via the channel from one side of the transformer to the other. Decoding circuitry on the rotating head assembly decodes the data and control information, and provides this information to preamplifiers mounted on the rotating head assembly. The control signals generate write current by controlling the power output of the pre-amplifiers which are coupled directly to the recording heads.

By providing the pre-amplifier circuitry driving the recording heads on the rotating section, with the preamplifiers coupled directly to the read/write heads, the preamplifiers drive the heads directly and the signal-to-noise ratio of the recorded data is greater than that realized in conventional rotating drum recording systems. In addition, the invention allows the recording of data to the tape without DC-free encoding, thereby greatly increasing the density of data stored to the tape and creating greater efficiency in the system.

FIG. 4 is a block representation of the system of the present invention. Read/write electronics for implementing the present invention are provided on both the stationary portion 200 and a rotating drum portion 100 of an arcuate scan head assembly. An arcuate scan tape drive including a stationary portion 200 and rotating portion 100 suitable for use with the present invention are taught in the Lemke application, and in U.S. patent application Ser. No. 08/113,996. However, it should be understood that the invention is not limited by the particular mechanical configuration which is set forth herein.

As should be generally understood by reference to these applications, the stationary portion 200 and rotating drum 100 are sub-components of an arcuate scan disk drive which serves as a peripheral device for a host computer system 50 such as, for example, a personal computer. Rotating drum 100 and stationary portion 200 are electrically coupled to each other by means of a rotary transformer 400 which comprises a stator 410, and a rotor 420. The stator 410 and rotor 420 each have multiple, opposing sets of windings which allow inductive coupling of signals across the gap between stator 410 and rotor 420.

The arcuate scan disk drive generally includes a number of elements to encode data and interact with host system 50. Host system 50 is coupled to a Small Computer System Interface (SCSI) controller 55. The SCSI controller 55 has a bi-directional connection to a DMA controller 57 which has a bi-directional connection to a memory buffer 59, a system control microprocessor 60, and formatter 220. Microprocessor 60 receives microcode instructions from ROM 56, and is also bi-directionally coupled to formatter 220. Power supply 500 may comprise a switch mode power supply and switch mode power supply controller 500. Alternatively, power supply 500 may comprise sine wave power supply or any suitable substitute.

Also provided on the arcuate scan drive is a read channel 210. Read channel 210 is coupled to and interacts with formatter 220 as discussed below, and is coupled to winding 434 of stator 410.

Figure 10:
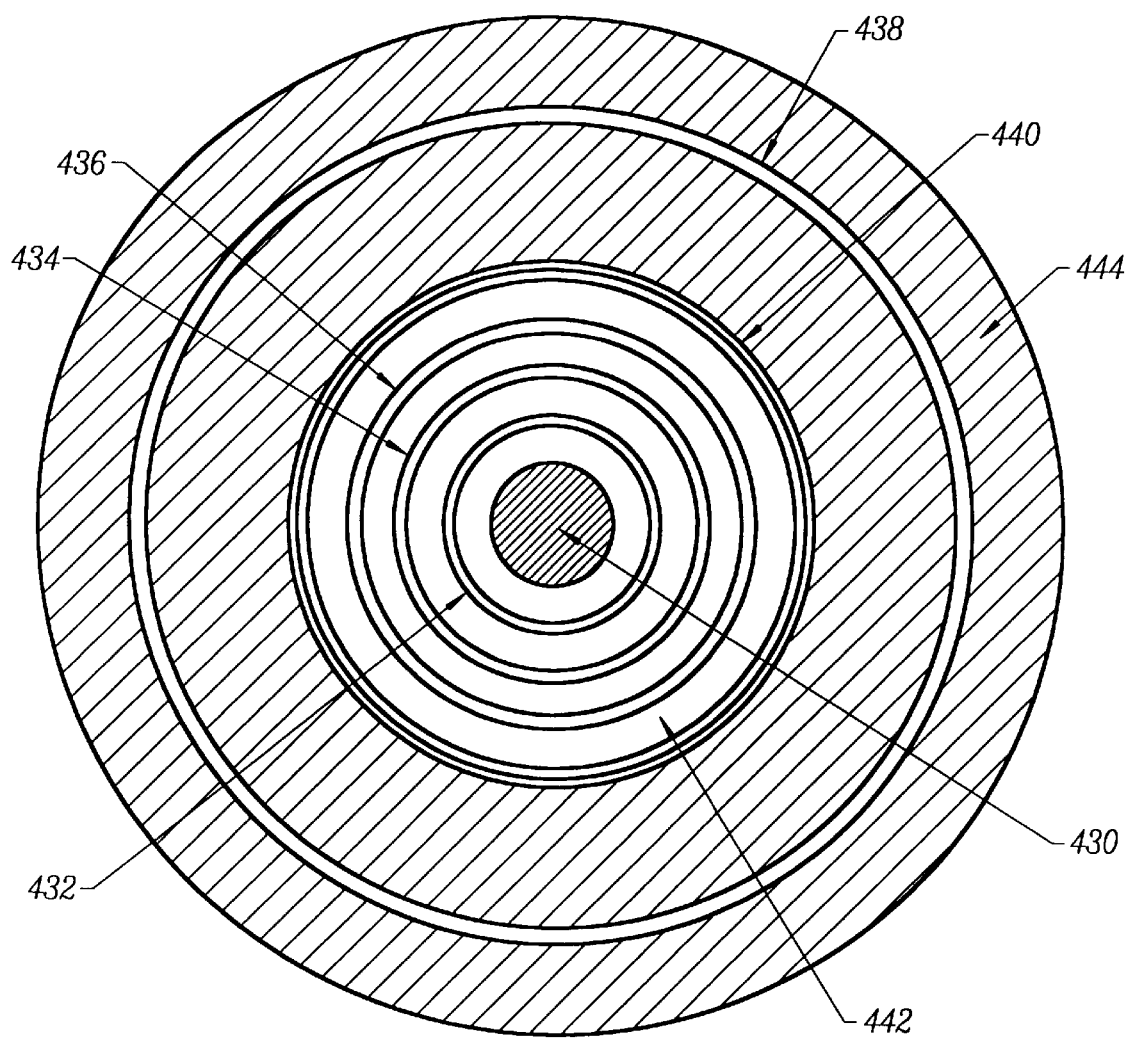
FIG. 10 is a plan view of one-half of a rotary transformer suitable for use with the read/write circuitry of the present invention.

FIG. 10 shows rotor 420 of rotating transformer 400. A hole 430 is used to mount rotor 420 onto a spindle for rotation with rotary drum 100 and with respect to stator 410. Four windings are shown including clock winding 432, a read signal winding 434, a write and control data winding 436, and a power winding 438. An air gap and shorting bar 440 separate power ferrite section 444 from data ferrite section 442. Signals on lines 232,232a; 234,234a; 240,240a; 243,245,247; (FIG. 4) are coupled across respective windings 436,432,434, and 438. It should be understood that the structure of stator 410 is identical to that of rotor 420 to allow signals transmitted between the respective windings.

Formatter 220 is coupled to windings 436,432 on a stator 410 via lines 232–232a,236–236a, respectively, and to read/write channel 210 via lines 221–225. Power supply 500 is coupled to winding 438 on stator 410 by lines 245,247.

Rotating drum 100 includes a plurality of read/write heads 110–117, shown in this embodiment as being divided into write dedicated heads 110–113 and read dedicated heads 114–117, each being coupled to one of two pre-amplifier circuits 120,130. In practice, each read/write head 110–117 is physically identical and may be manufactured in accordance with the teachings of co-pending U.S. patent application Ser. No. 08/151,068. (In the embodiment discussed herein, the read head gaps and write head gaps have alternating azimuthal angles with respect to the tracks, as discussed below with respect to FIG. 5A.) Pre-amplifier circuits 120,130 are mounted on rotating drum 100 and are coupled to a decoder or "de-serializer" 150 via lines 234,238, the function of each of which is described below. Pre-amplifiers 120,130 are also coupled to windings (not shown) complementary to windings 438 on rotor 400 by line 242 to provide read voltage to data channel 210. Two digital-to-analog converters 125,135 are provided between de-serializer 150 and pre-amps 120,130, respectively. De-serializer 150 is coupled to windings (not shown) on rotor 420 complementary to windings 432 and 436 on stator 410 by lines 234,238. Also located on rotating drum 100 is a rectifier 160 which provides a regulated $v_{cc}$ output to drive pre-amps 120,130. Rectifier 160 is coupled to rotor 420 via lines 246,248 and 244, and receives the output of power supply 500 via lines 246,248. Rectifier 160 is coupled to ground, and provides a regulated $v_{cc}$ output to capacitor $C_1$ on stationary portion 200 via lines 244, transformer 400, and line 243.

In general, operation of the read/write circuitry shown in FIG. 4 is as follows. In a write mode, formatter 220 receives data (in logical blocks) and write instructions from the host system 56 via SCSI controller 55 and controller 57. In accordance with well-known principles, formatter 220 converts the binary user data into modulated data using any of a number of conventional coding schemes, such as non-return-to-zero (NRZ) code, and provides the coded data (NRZ DATA), along with a sync-write clock (WCLK) to read/write channel 210. Read/write channel 210 encodes the incoming coded data (NRZ DATA) with error correction coding, in a well-known format, such as, for example, a 1,7 run length limited (RLL) read/write code to ensure proper transmission of the data signals across rotating transformer 400. A PR4ML partial response channel, fabricated in accordance with well-known principles, using well-known components, and implementing conventional definitions for PR4ML coding, may also be utilized.

Read/write channel 210 then provides encoded write data (WD) to formatter 220 on line 225.

Formatter 220 then encodes the write data (WD) provided by channel 210 with control information including write current for pre-amplifiers 120,130, and servo information, and provides the write data and control information in the form of an encoded, synchronous data stream (iWDN) on lines 232,232a. Lines 232 and 232a are intended to represent the differential or single ended signal drive which is coupled to winding 436 on rotating transformer 400. A differential or single ended driver may be utilized to provide the synchronous data stream, as represented by line 232a. Line 232a may be returned to a voltage source for the single ended driver. Formatter 220 also provides a clock signal on line 236 (with a differential or single ended component represented by line 236a) which is synchronized with the write and control data output on line 232. Both the synchronous data stream and clock signal are rectified on the rotor side of the rotating transformer to provide positive input signals to the deserializer. The clock signal iCLK is utilized by deserializer 150 to decode the data in data stream iWDN, as discussed below. Thus, the total number of windings on rotary transformer 400 dedicated to carrying the user data, write control data, and clock signals is two (lines 232 and 236).

During a write, power supply 500 is enabled by a control signal R/W CONTROL generated by host 50, formatter 220, or other suitable control means, to provide pulsed DC or sinusoidal output on lines 245,247 to the power winding of stator 410. The power signal is commutated to power winding 438 on rotor 420 and via lines 246,248 to rectifier 160. As noted above, rectifier 160 provides a regulated output R $v_{cc}$ to pre-amplifiers 120,130. At the same time, capacitor $C_1$ stores charge for use during the read mode.

De-serializer 150 decodes write data and control information (iWDN) transmitted from formatter 220, using the clock signal provided on line 238. De-serializer 150 then provides write control signals and user data to pre-amplifiers 120,130 which drive heads 110–117 to write data on the tape.

In a read mode, formatter 220 disables power supply 500 and power to pre-amplifiers 120,130 is maintained by capacitor $C_1$, and other capacitors (shown in FIG. 11), which accumulate charge during the write mode. Heads 110–117 detect flux changes on the tape and these changes, in the form of a read-back voltage signal, are transmitted to data channel 210 via lines 240,240a,242,242a.

Data channel 210 decodes the read signal based on the modulation encoding scheme utilized in the particular embodiment. Data channel 210 then provides the read data signal (RDATA), on line 224, and a read clock signal (RDCK), on line 223, to formatter 220 for provision to host 50.

Figure 5A:
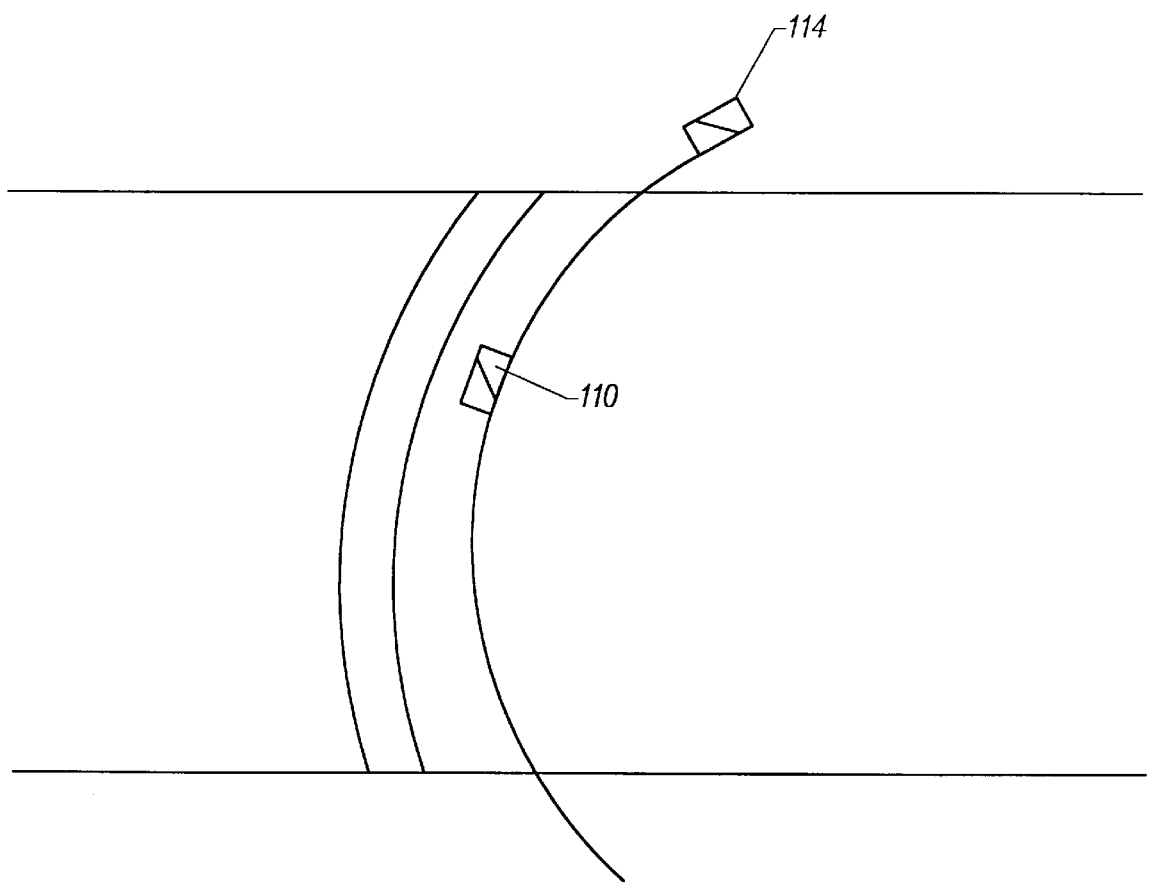
FIG. 5A is a representation of successive heads on an arcuate scan drive passing by a tape medium.
Figure 5B:
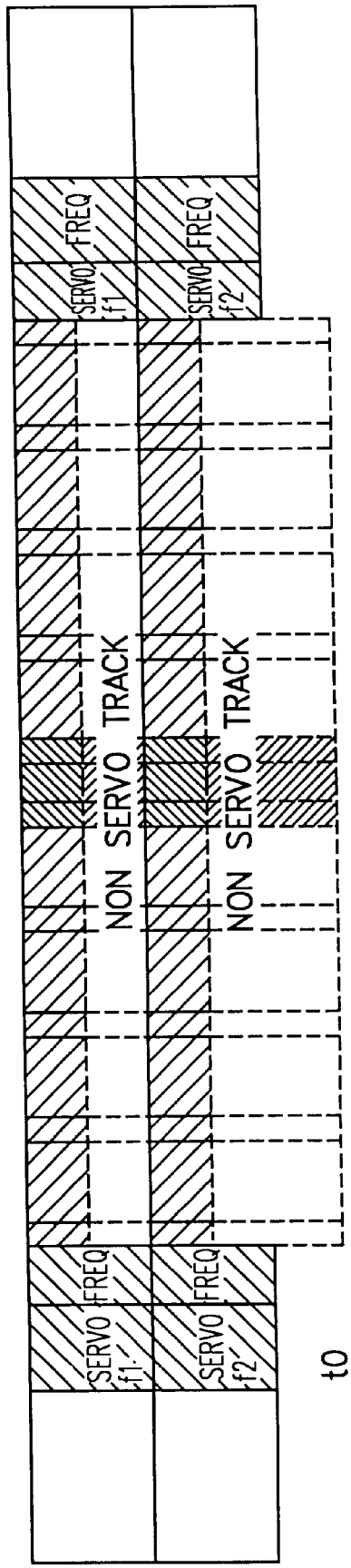
FIG. 5B is a block representation of the relative positioning of positive and negative azimuth data tracks.
Figure 5C:
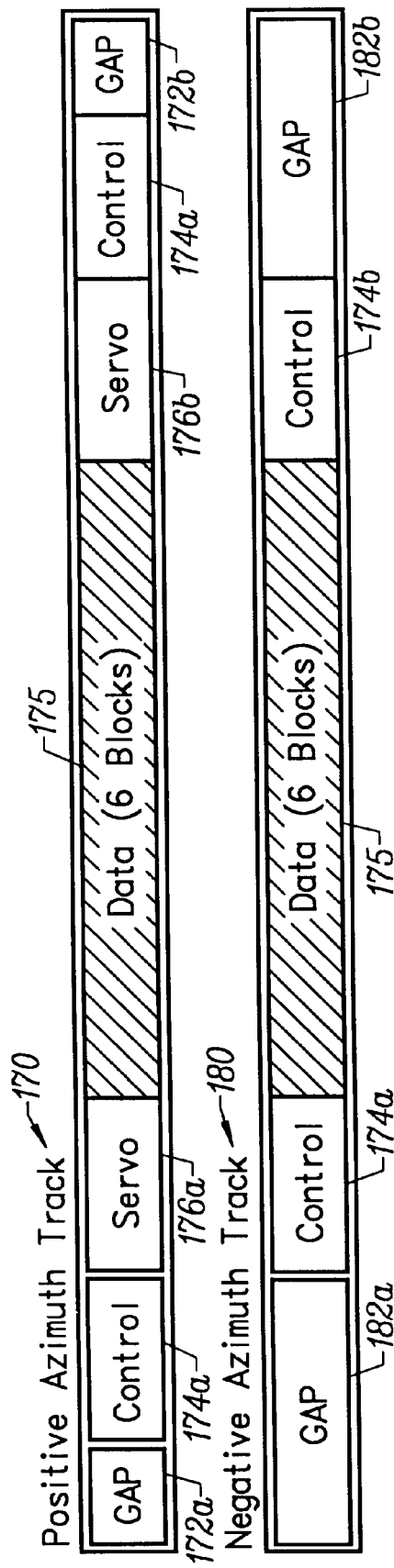
FIG. 5C is a block representation of the information contained on both a positive azimuth and negative azimuth data track.
Figure 5D:
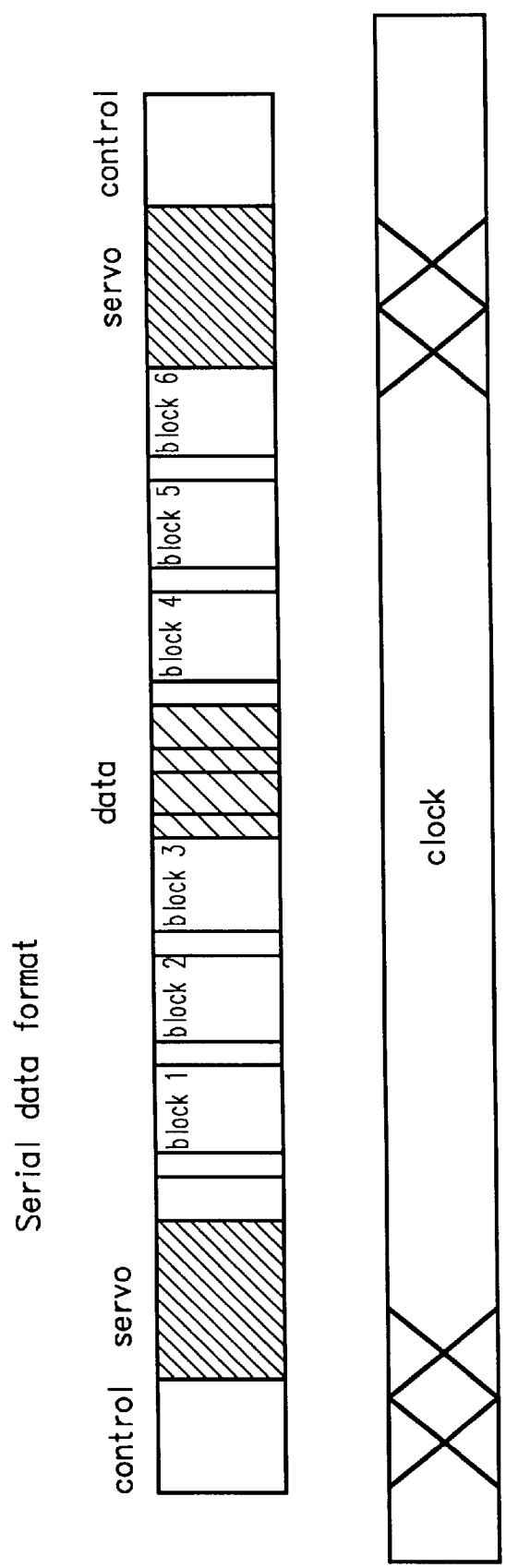
FIG. 5D shows a comparison between the typical data track and the write clock signals.

FIGS. 5B and 5C show the format of the data as written on a given track. In the arcuate scan drive described in copending U.S. application Ser. No. 08/113,996, the read and write heads are positioned such that the recording gaps of adjacent heads are alternatively angled with respect to a radial emanating from the rotational axis 38 of the drum toward the head. This is illustrated in FIG. 5A. Generally, positive azimuth tracks are passed by "write" heads, while negative azimuth tracks are passed by "read" heads. Thus, two types of data tracks result, a positive azimuth track and a negative azimuth track, depending upon the azimuthal angle (positive or negative) of the head with respect to the radial. A positive azimuth or servo track includes servo data, while a negative track has no servo data. As shown in FIG. 5B, the positive and negative azimuth tracks are recorded in an overlapping fashion to maximize the storage density of the tape. As shown in FIG. 5C, the positive azimuth track 170 includes a guard band or gap area 172a, 172b, control data 174a, 174b, servo data 176a, 176b, and six blocks of user data 175. Negative azimuth track 180 includes gaps 182a, 182b, control data 174a, 174b, and six blocks of user data 175. Gaps 172a, 172b, 182a and 182b are generated by the write heads at the beginning and end of each track. FIG. 5D shows the synchronization between the clock signals on lines 236,236a and the write control data on lines 282,282a.

Figure 6:
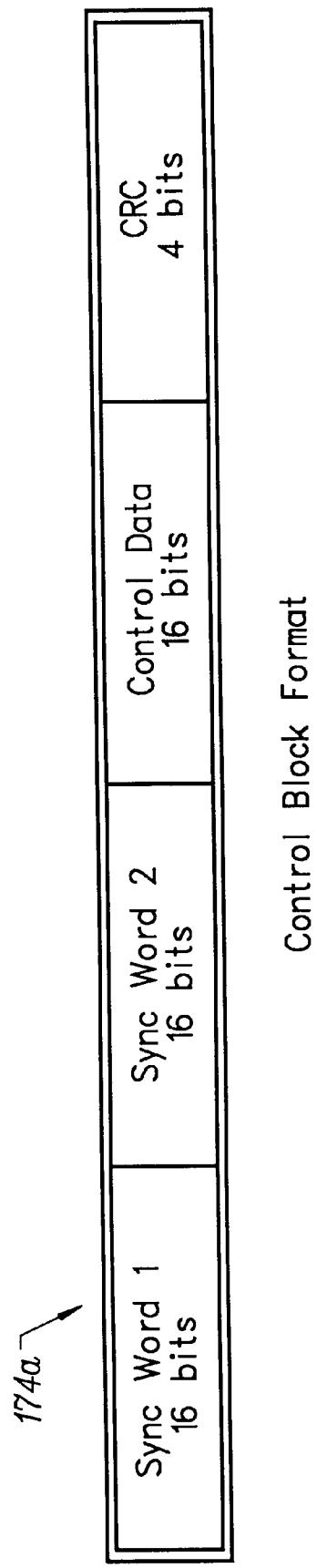
FIG. 6 is a block diagram of the control block format used in conjunction with the present invention.

The format of control block 174a is shown in FIG. 6. Each control block contains a 32-bit synchronization pattern comprised of two 16-bit words Sync Word 1, Sync Word 2, a 16-bit control word, and 4 bits of CRC code. As discussed in detail below, de-serializer 150 continuously scans the write data for the 32-bit sync pattern (Sync Word 1, Sync Word 2). Once the synchronization pattern is detected, the subsequent 16 bits of control data is stored in a serial data shift register or transferred to a holding register, provided no errors are detected in the CRC data field. The control data selects one of the eight heads 110–117, enables read/write operation, establishes the write current, and provides write data to pre-amplifiers 120,130. A CRC failure will place the pre-amplifier into a read mode by forcing the write enable control line inactive. As detailed below, both Sync Word 1 and Sync Word 2 must be detected to enable the write mode operations. A sync word which is unique to both 1,7 RLL and PR4 methods of data encoding is utilized in one embodiment.

Serial control data is received from the formatter 220 via transformer 400 at the beginning and end of each write track, as shown by blocks 174a,174b in FIG. 5A. A minimum of eight clock periods are required to provide time for the rotary transformer output waveform to settle prior to transmitting the first 16-bit sync word (Sync Word 1) at the beginning of a data track to be written onto the tape. Signal timing is such that the control word is transferred while the particular head is positioned over the gap areas, just prior to the first servo block on a positive azimuth track, and immediately following a last servo block. During negative azimuth tracks, the servo area remains unrecorded, as shown in FIG. 5C.

The 16 bit control word format is shown in FIG. 7. Bit 15 enables or disables de-serializer 150 to drive the pre-amplifier chips and is used in conjunction with bit 10 to select pre-amplifier 120 or 130, the function of which is output via lines CS (chip select) shown in FIGS. 4 and 8. Bit 14 (write enable) enables the user data to be written onto tape and must be enabled active upon correct receipt of a control block. Bits 11 through 13 are currently unused. Bits 8, 9 and 10 comprise the head select field and determines which head 110–117 is to be used for a subsequent read or write data transfer. Bits 4 through 7 select the current level to be used for the subsequent write operation on a positive azimuth track, while bits 0 through 3 select the current level to be used for a subsequent write operation on a negative azimuth track.

The CRC data check is a 16-bit, calculated data field derived from the 4 bits of data transmitted in the control block 174a as shown in FIG. 6 to verify the integrity of the communication channel. Any CRC error will cause de-serializer 150 to negate the write control signal (WRITE-N in FIG. 8) and maintain the current values for head selection and write current control. The CRC-generated polynomial is as follows:

$$G(X)=X^3+X^2+X^0+1.$$

Figure 8:
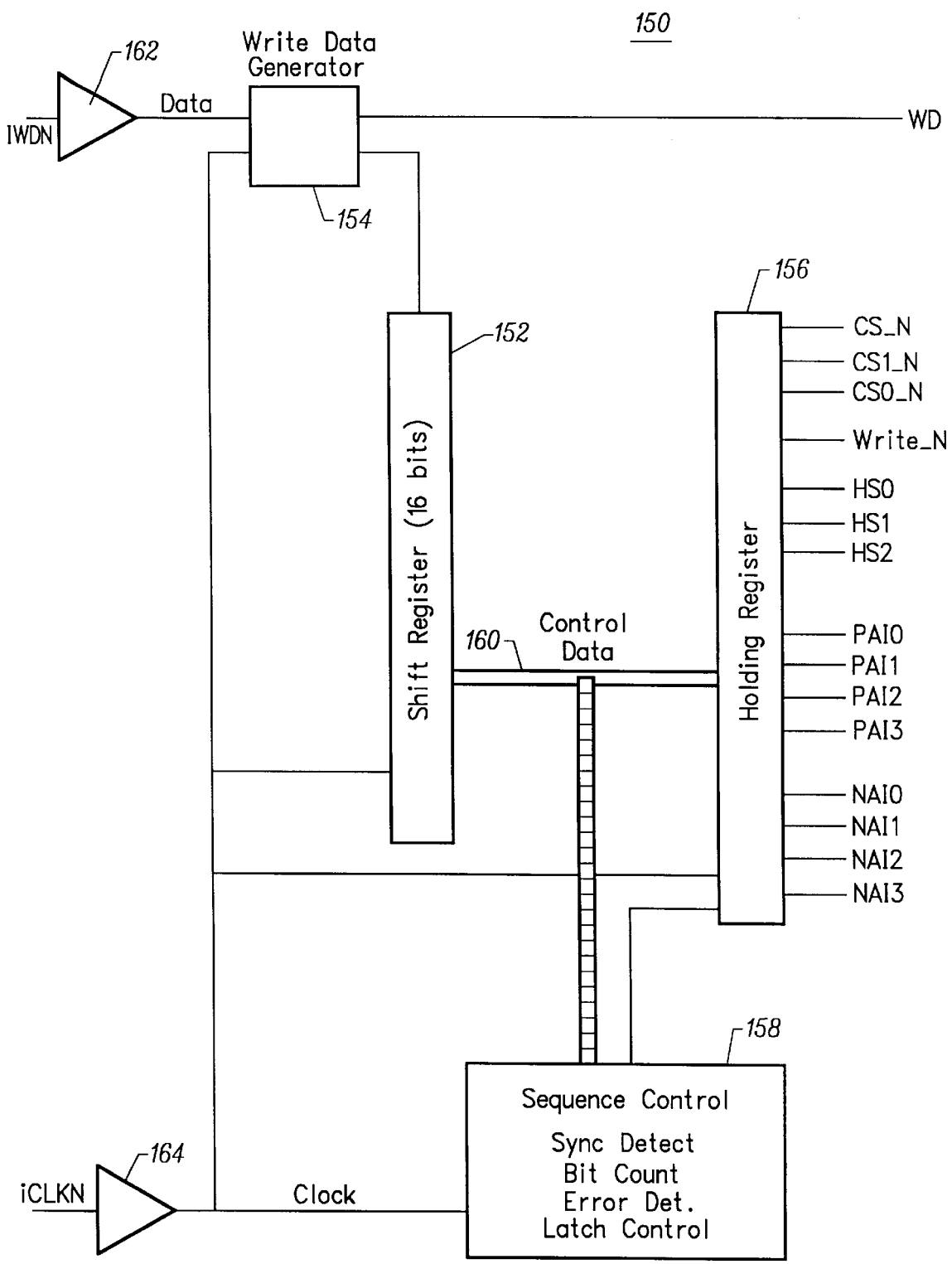
FIG. 8 is a schematic diagram of the deserializing of the present invention.

The structure and operation of de-serializer 150 will be discussed with reference to FIG. 8. De-serializer 150 generally includes an input data shift register 152, a write data generator 154, a control word holding register 156, and a sequence control module 158. These modules operate in conjunction to perform a serial-to-parallel data conversion by monitoring the serial bit stream provided from formatter 220 for proper synchronization of the 32-bit control word, then transferring the following 16 bits of control data from serial shift register 152 to control word holding register 150 via transmission line 160. The output of the control word holding register 156 directs operation of the read/write pre-amplifiers 120,130. Two Schmitt trigger input buffers 162,164 are also provided. Buffers 162,164 have a threshold load high voltage of 3 volts ±300 mV, and a high to low threshold of 2 volts ±300 mV. Hysteresis is 1 volt typical, 700 mV minimum.

The input write data (iWDN) is provided to the write data generator 154 from formatter 220 via rotary transformer 400 as discussed above. Input buffer 162 is provided at the data and control signal input of de-serializer 150.

The input write data signal (iWDN) is the output of the formatter 220 with the write data and write control information. The signal is pulsed low for each transition of an NRZ wave form to be written onto tape. The falling edge of the data pulse is internally latched by the write data generator 154 and synchronized to the falling edge of the input clock (iCLKN) which is received via Schmitt trigger input buffer 164 on line 238. The synchronization pulse transition representing the NRZ data format is then converted to binary form by write data generator 154 for use by other modules. The converted NRZ bit stream is re-encoded by write data generator 154 to generate a single pulse-per-transition output signal W/D for use by either amplifier 120,130. Write data generator 151 also provides the input control data for the serial shift register, which is monitored for the presence of the control word information.

Figure 9:
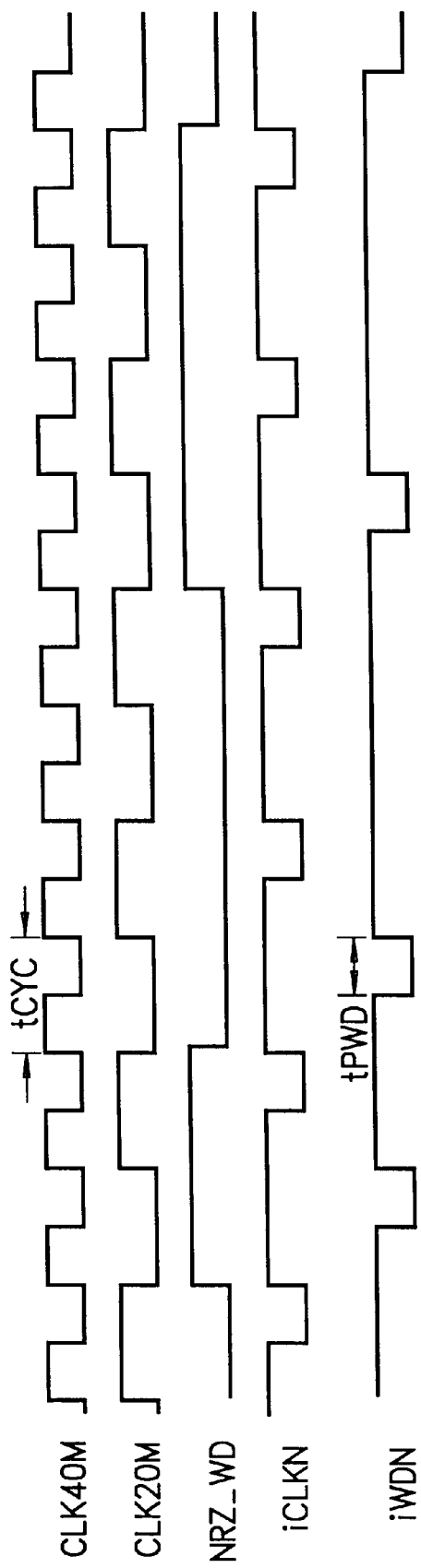
FIG. 9 is a timing diagram showing the clock signals and write signals of the read/write circuitry of the present invention.

The relationship between the input clock (iCLKN), the input data (iWDN) and the write data signal WD in NRZ code (NRZ_WD) is shown in FIG. 9. As discussed above, the pulse transition is generated by latching the decoded NRZ data pattern on the negative clock transition, and then using the positive clock edge to clear the output register. This operation generates an output pulse having a width which is one-half of the clock period (CLK 20M). Input clock (iCLKN) provides a constant clock equal to the bit rate at which data is recorded onto the tape. This positive transition clocks information on the data line (iWDN) into de-serializer 150. The polarity of the signal shown in FIG. 9 is the same for both the primary and secondary windings of the rotary transformer. In the PR4 coding embodiment, the period $T_{CYC}$ is approximately 33 nanoseconds, with the period $T_{PWD}$ having a minimum value of 15 NS and a maximum of 18 NS. In a 1,7 RLL coding technique, the period $T_{CYC}$ is 50 NS, with the period $T_{PWD}$ having a minimum cycle of 23 NS and a maximum of 27 NS.

Shift register 152 receives serial binary information from the write data generator 154. Data is continuously shifted into register 152 on the negative transition of the input clock (iCLKN).

Holding register 156 latches and holds control information from data shift register 152. This information is decoded to drive the various signals controlling operation of the heads 110–117. In the event of a CRC failure, the write enable control bit (WRITE_N) is cleared and no further register updates are permitted until the next control word is received.

Sequence control 158 is responsible for governing the operation of de-serializer 150. Digital logic in this module continuously monitors the serial bit stream for the presence of the control words. Once the synchronization sequence (Sync Word 1, Sync Word 2) is detected, the bit counter is enabled and the next 16 bits are loaded into the shift register 152. As each bit is received, a CRC calculation is performed in accordance with the aforementioned polynomial to verify the accuracy of the control word received. Following the control word, the 4-bit CRC is received and compared to the regenerated value. If no errors are detected, the control word is transferred from serial shift register 152 to the holding register 156 and the process is re-started. In the event of a CRC failure, the write enable bit (WRITE_N) in the holding register is cleared, placing the pre-amplifiers 120,130, into a read mode enabling heads 114–117.

Holding register 156 includes 15 control outputs generally subdivided as follows. Chip select pins CS_N, CS1_N and CS0_N enable operation of one of the two pre-amps 120, 130. For example, an active low output on CS0_N enables operation of pre-amplifier 120. The signal is driven active if control word bit 10 is low and the master chip select (control word bit 15) is active. Head select outputs HS0–HS2 select which one of the eight read/write heads 110–117 is enabled for data transfer. The state of these lines is a direct result of the control word bits 8–10, discussed above.

Positive azimuth current lines PAI0–PAI3 and negative azimuth current lines NAI0–NAI3 enable and define the current output of pre-amps 120,130 via digital-to-analog converters 125,135 respectively. The output lW1, lW2 of converters 125,135 is coupled to preamps 120,130, respectively.

In a read mode, the preamplifiers 120,130 are utilized to amplify the read-back voltage generated by the flux transitions recorded to tape and detected by heads 110–117. Preamps 120,130 provide a differential pair read-back signal to transformer 400, which is commutated from windings 434 on disk 420 to disk 410 and provided to data channel 210. Data channel 210 decodes the read signal and provides the read data RDATA and clock RDCK to formatter 220. Formatter 220 removes the data appended during write formatting and ECC. Blocks of data are then transferred to DMA controller 59 and host 50 in a manner well known in the art.

Figure 11:
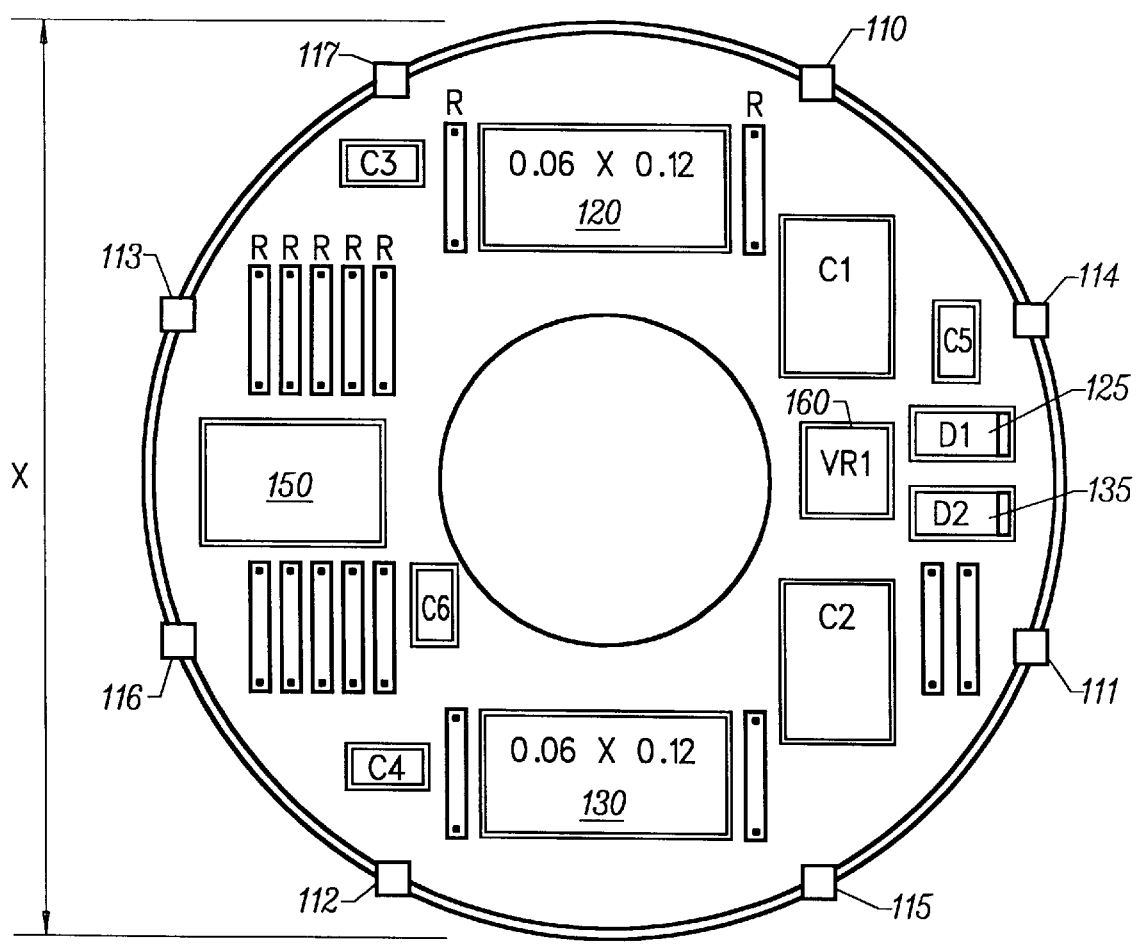
FIG. 11 is a plan view of a packaging scheme suitable for use with the read/write circuitry of the present invention.

FIG. 11 shows a packaging format for the components shown in FIG. 4 of the rotating head drive 100.

As shown in FIG. 11, the elements described above may be provided in a convenient format for use in an arcuate scan disk drive. The distance X shown in FIG. 11 is, in one embodiment, approximately 0.70" and comprises the diameter of the rotating section 100 of the arcuate scan recording device. Also shown in FIG. 11 are capacitors C1, C2, C3, C4, C5, and C6 which function to store charge during write mode to power pre-amplifiers 125,135 during read mode. A total capacitance in the range of 30–40 µF is sufficient storage to allow power supply 500 to be shut off during read mode.

The packaging scheme shown in FIG. 11 allows for precise balancing of the components described with respect to the recording apparatus of the present invention about the rotational axis of the device. This ensures no mass balancing issues with respect to rotation of the rotating section 100 and is a substantial advantage in applying the present invention to a practical embodiment.

The many features and advantages of the present invention will be apparent to those of average skill in the art. For example, the distinct advantage of the present invention is the fact that the drive designer is no longer required to utilize DC-free code in recording to data on the tape thereby increasing the effective storage density of the drive. In addition, the signal-to-noise ratio of the recorded data is improved over prior arcuate scan recording schemes. All such features and advantages are intended to be within the scope of the invention as defined in the written description, drawings, and the following claims.

What is claimed is:

1. A circuit having a stationary portion and a rotating portion, comprising:
    a stationary encoder outputting an encoded write signal;
    a power supply;
    a rotary transformer comprising a stator and a rotor, the stator having at least one stator winding and the rotor having at least one rotor winding, the stationary encoder coupled to the stator winding;
    a decoder having an input coupled to said at least one rotor winding and rotating with the rotor, the input receiving the encoded write signal, the decoder further having an output;
    an amplifier coupled to receive the decoder output, and further being coupled to the power supply via the rotating transformer, the amplifier rotating with the decoder and the rotor; and
    at least one read/write head, coupled to receive an amplifier output from the amplifier and return a read data signal to the amplifier.

2. The circuit as claimed in claim 1 wherein the rotary transformer further includes at least a first and second channels, each channel comprised of a rotor winding and a corresponding stator winding, and wherein the power supply and amplifier are coupled via the first channel, and the encoder and decoder are coupled via the second channel.

3. The circuit as claimed in claim 2 further including a power rectifier coupled between the rotor winding of the first channel and the amplifier.

4. The circuit as claimed in claim 2 wherein the rotary transformer further includes a third channel and the encoder provides a clock output signal to the decoder via the third channel.

5. The circuit as claimed in claim 4 wherein the rotary transformer further includes a fourth channel coupled to the amplifier and the read/write head, the fourth channel having relative isolation from the first channel.

6. The circuit of claim 1 further including a plurality of read/write heads coupled to the amplifier, and wherein the control signals include information for selecting one which of the plurality of heads is used for recording at a given time.

7. The circuit of claim 1 further including a capacitor, coupled to the amplifier and the power supply, for storing charge when the power supply is active, and providing charge to the amplifier when the power supply is not active.

8. An arcuate scan head assembly for a storage device, including a host interface, a rotating head drum, and a stationary portion, comprising
    a rotating transformer including at least a first and second channels between a stator coupled to the stationary portion and a rotor coupled to the rotating portion;
    a data channel on the stationary portion;
    a formatter coupled to the data channel and the first channel of the transformer, the formatter providing a synchronous write data and control output signal;
    a power supply coupled to the second channel of the transformer;
    a decoder provided on the rotating head drum and coupled to the first channel of the transformer and receiving the synchronous write data and control output signal, the decoder having a plurality of control outputs and a data output;
    an amplifier on the rotating head drum coupled to the control and data outputs of the decoder, and the power supply; and
    at least one read/write head on the rotating head drum coupled to the amplifier.

9. The arcuate scan head assembly as defined in claim 8 wherein the decoder, amplifier and heads are arranged such that the head drum is balanced for rotation about the axis.

10. The arcuate scan head assembly as defined in claim 9 wherein the head drum has a diameter of about 0.7 inch.

11. The arcuate scan head assembly as defined in claim 8 including a plurality of read/write heads coupled to the amplifier.

12. The arcuate scan head assembly as defined in claim 8 wherein the decoder provides the control information to a digital-to-analog converter to drive the amplifier and the head to record the data to the data storage medium.

13. The arcuate scan head assembly as defined in claim 8 wherein the formatter encodes user data with control information for the amplifier to generate the synchronous data and control output.

14. The arcuate scan head assembly of claim 13 wherein the data stream includes a control word, servo information and error coding.

15. The arcuate scan head assembly of claim 13 wherein the user data is encoded by the data channel prior to provision to the formatter with an NRZ coding format.

16. The arcuate scan head assembly of claim 13 wherein the user data is encoded by the data channel prior to the provision to the formatter with a PR4ML encoding format.

17. The arcuate scan head assembly as defined in claim 13 wherein the decoder includes a write data generator, a sequence controller, a shift register and a holding register.

18. The arcuate scan head assembly as defined in claim 17 wherein the write data generator decodes the control information and provides the control information to the shift register after verifying the presence of a synchronization stream.

19. The arcuate scan head assembly as defined in claim 8 further including a power supply filter on the rotor and rotating with the rotor.

20. An apparatus for a storage device, the storage device including a rotating section and a stationary section, comprising:
    a rotating transformer having a rotor coupled to the rotating section and a stator coupled to the stationary section, the rotating transformer including a plurality of channels;

a read/write channel provided on the stationary section;

a write data and control signal encoder provided on the stationary section and coupled to provide an encoded write signal to a first channel of the rotating transformer;

a power supply provided on the stationary section and coupled to a second channel of the rotating transformer;

a decoder provided on the rotating section and coupled to the first channel to receive the encoded write signal and provide a write data signal;

at least one amplifier provided on the rotation section and coupled to receive the write data signal from the decoder and coupled to the second channel of the rotating transformer; and at least one read/write head provided on the rotating portion and coupled to receive an amplifier output of the write date signal from said at least one amplifier and to provide a read signal to the amplifier.

21. The apparatus of claim 20 wherein the read/write channel comprises a PR4ML channel.

22. The apparatus of claim 20 wherein the read/write channel comprises a 1,7 RLL code channel.

23. The apparatus of claim 20 wherein the decoder includes a data input and a clock input, wherein the data input is adapted to receive serial data and control information.

24. The apparatus of claim 20 wherein the power supply comprises a switch mode power supply.

25. A data storage device for a host computer, comprising:

a host interface;

a data channel coupled to the computer and carrying data;

a tape storage medium having a surface; and an arcuate scan assembly interacting with the tape storage medium, the arcuate scan assembly including:

a stationary portion having
a motor,
a stator,
a formatter, coupled to the stator and the data channel, generating control signals and sequencing write data signals with the control signals, and a rotating portion having
a plurality of rotating heads mounted on a head drum, the head drum
being rotated about an axis orthogonal to the tape surface,
a rotor,
a data and control signal decoder, coupled to receive the formatted write data
a pre-amplifier coupled to the data and control signal decoder, and the heads, supplying data signals to the heads in a write mode and receiving data signals from the tape via the heads in a read mode.

26. A method for reading and writing data to a tape storage medium, comprising:

providing a rotating head drum adjacent to the tape, the head drum including at least one read/write head and an amplifier coupled to the head;

encoding pre-amplifier control signals and the data in a synchronous signal;

transmitting the synchronous signal through a rotating transformer to the head drum;

transmitting a clock signal through the rotating transformer;

transmitting a power to the preamplifier; and decoding the synchronous signal so that the preamplifier is directed to write the data to the tape.

27. A circuit having a stationary portion and a rotating portion comprising:

means for generating a composite signal, said means located on said stationary portion, said composite signal including a control portion;

means for transferring said composite signal from said stationary portion to said rotating portion;

means for extracting said control portion of said composite signal, said means for extracting located on said rotating portion; and means for amplifying a signal, said means including at least a first mode for receiving a signal as input and providing an amplified signal as an output, said means located on said rotating portion, said control portion of said composite signal selectively enabling said mode.

28. A circuit as claimed in claim 27 wherein said means for transferring said composite signal from said stationary portion to said rotating portion is a transformer.

29. A circuit as claimed in claim 27 wherein said means for extracting said control portion of said composite signal is a de-serializer.

30. A circuit as claimed in claim 27 further including:

a magnetic recording head, said magnetic recording head located on said rotating portion, said magnetic recording head being selectively connected to an input of said means for amplifying a signal; and wherein said means for amplifying a signal includes a second, read mode, said read mode being responsive to said control portion of said composite signal.

31. A circuit as claimed in claim 27 wherein the means for transferring is coupled to said output of said means for amplifying a signal and said means for transferring transfers said output from said rotating portion to said stationary portion.

32. A circuit as claimed in claim 27 wherein said means for amplifying a signal is a preamplifier.

33. A circuit as claimed in claim 27 further including:

a magnetic recording head, said magnetic recording head located on said rotating portion, the input of said magnetic recording head selectively connected to said output of said means for amplifying a signal; and wherein said first mode comprises a write mode, said write mode enabled by said control portion of said composite signal and receiving a portion of the composite signal as input.

34. A circuit as claimed in claim 27 further including:

a means for generating a second signal, said means located on said stationary portion; and means for transferring said second signal from said stationary portion to said rotating portion.

35. A circuit as claimed in claim 27 wherein the second signal is a clock signal.

36. A circuit as claimed in claim 35 further including:

a means for generating a third signal, said means located on said stationary portion; and means for transferring said third signal from said stationary portion to said rotating portion.

37. A circuit as claimed in claim 27 wherein the means for generating a third signal is a power supply.

38. A circuit having a stationary portion and a rotating portion, comprising:

an encoder circuit on the stationary portion of the circuit, the formatter having an output providing a composite signal having a data portion and control information;

means coupled to the output of the formatter for transferring said composite signal from said stationary portion to said rotating portion;

a decoder circuit on the rotating portion and coupled to receive the composite signal to extract the control information and the data portion; and an amplifier on the rotation portion having at least a first input coupled to the decoder and a first output providing an amplified signal responsive to the control information, the amplifier having a second input coupled to receive a data signal as input, responsive to the control information.

39. A circuit as claimed in claim 38 wherein said means for transferring said composite signal from said stationary portion to said rotating portion is a transformer.

40. A circuit as claimed in claim 39 wherein said transformer includes a rotating portion and a stationary portion respectively associated with the rotating portion and stationary portion of the circuit.

41. A circuit as claimed in claim 38 wherein the composite signal is a serial data stream.

42. A circuit as claimed in claim 41 wherein said decoder includes a de-serializer circuit.

43. A circuit as claimed in claim 39 further including:

a read head, said read head located on said rotating portion, the output of said read head comprising said data signal selectively connected to the amplifier; and wherein the amplifier includes a read mode, said read mode enabled by said control portion of said composite signal.

44. A circuit as claimed in claim 39 further including:

a write head, said write head located on said rotating portion, the input of said write head selectively connected to said output of said means for amplifying a signal; and said means for amplifying a signal having a write mode, said write mode enabled by said control portion of said composite signal and receiving a signal as input.

45. A circuit as claimed in claim 39 further including:

a means for generating a second signal, said means located on said stationary portion; and wherein said means for transferring includes means for coupling said second signal from said stationary portion to said rotating portion.

46. A circuit as claimed in claim 45 wherein the second signal is a clock signal.

47. A circuit as claimed in claim 45 further including a read head on the rotating portion, the read head providing a read data signal of recorded data retrieved by the read head, and said means for amplifying further includes:

a read mode wherein the amplifier receives the recorded data signal and amplifies the recorded data signal.

48. A circuit as claimed in claim 45 wherein the stationary portion includes a power supply which generates a power signal which is coupled from the stationary portion to the rotating portion.

* * * * *